(12) United States Patent
Miyagi

(10) Patent No.: US 7,047,539 B2
(45) Date of Patent: May 16, 2006

(54) DISC DRIVE APPARATUS AND ELECTRONIC DEVICE WITH INDICATION MECHANISM USING A PLURALITY OF LIGHT EMITTING ELEMENTS

(75) Inventor: Junji Miyagi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 323 days.

(21) Appl. No.: 10/623,841

(22) Filed: Jul. 21, 2003

(65) Prior Publication Data

US 2004/0017739 A1    Jan. 29, 2004

(30) Foreign Application Priority Data

Jul. 23, 2002   (JP)   ................ 2002-004543 U

(51) Int. Cl.
  *G11B 7/85* (2006.01)
  *G11B 33/12* (2006.01)
(52) U.S. Cl. .............. 720/646; 369/30.36; 369/53.2; 720/652
(58) Field of Classification Search ............. 720/646, 720/652; 369/30.36, 53.2
  See application file for complete search history.

(56) References Cited

FOREIGN PATENT DOCUMENTS

| | | |
|---|---|---|
| JP | 1-307984 | 12/1989 |
| JP | 6-223553 | 8/1994 |
| JP | 8-184713 | 7/1996 |
| JP | 8-223365 | 8/1996 |
| JP | 10-200168 | 7/1998 |
| JP | 10-284757 | 10/1998 |
| JP | 11260568 A * | 9/1999 |
| JP | 2001-53340 | 2/2001 |
| JP | 2001-215313 | 8/2001 |
| JP | 2002-32029 | 1/2002 |
| JP | 2002091352 A * | 3/2002 |

OTHER PUBLICATIONS

Patent Abstracts of Japan No. 08184713A, published on Jul. 16, 1996 (1 page).
Patent Abstracts of Japan No. 01307984A, published on Dec. 12, 1989 (1 page).
Patent Abstracts of Japan No. 2002032029A, published on Jan. 31, 2002 (1 page).

(Continued)

*Primary Examiner*—Brian E. Miller
(74) *Attorney, Agent, or Firm*—Osha Liang LLP

(57) ABSTRACT

A disc drive apparatus using a disc-like recording medium includes a casing, a substrate, two LEDs, a light guiding member, a white print portion, and a motor. The light guiding member is arranged adjacent to the two LEDs on the substrate for guiding light emitted from the LEDs. The white print portion is positioned in a light emitting direction of the LEDs, and is formed on a surface of the substrate positioned below the light guiding member. The motor is arranged adjacent to the light guiding member and the white print portion on the substrate. The light guiding member is provided with a satin finish at a surface of a portion facing the LEDs. The front panel includes a protrusion protruding below a portion that is farthest from the LEDs in a portion adjacent to a light emitting indication portion of the light guiding member.

9 Claims, 4 Drawing Sheets

OTHER PUBLICATIONS

Patent Abstracts of Japan No. 2001215313A, published on Aug. 10, 2001 (1 page).
Patent Abstracts of Japan No. 06223553A, published on Aug. 12, 1994 (1 page).
Patent Abstracts of Japan No. 10200168A, published on Jul. 31, 1998 (1 page).
Patent Abstracts of Japan No. 10284757A, published on Oct. 23, 1998 (1 page).
Patent Abstracts of Japan No. 08223365A, publishedo n Aug. 30, 1996 (1 page).
Patent Abstracts of Japan No. 2001053340A, published on Feb. 23, 2001 (1 page).

* cited by examiner

DISC DRIVE APPARATUS AND ELECTRONIC DEVICE WITH INDICATION MECHANISM USING A PLURALITY OF LIGHT EMITTING ELEMENTS

BACKGROUND OF THE INVENTION

1. Field of the Invention

The present invention relates to a disc drive apparatus and an electronic device for loading a disc-like recording medium as represented by CD-ROM (Compact Disc-Read Only Memory) and a DVD (Digital Versatile Disc), and more specifically, to a disc drive apparatus and an electronic device with an indication mechanism using a plurality of light emitting elements.

2. Description of the Background Art

Conventionally, some electronic devices such as a disc drive apparatus include an indication mechanism that switches between two colors of illumination for the purpose of indicating the operating state thereof. As one scheme for implementing such an indication mechanism, a two-color LED (light emitting diode) that can emit light in two different colors has been employed. Such a two-color LED is disclosed, for example, in Japanese Patent Laying-Open No. 10-200168 and Japanese Patent Laying-Open No. 10-284757.

Another scheme for implementing such an indication mechanism is to arrange two different types of LEDs (that are each capable of emitting light in a needed color) and to switch between them to cause them to emit light alternatively. Such a method employing two LEDs has an advantage of the great flexibility in selecting the illumination colors and the availability of relatively inexpensive single-color LEDs.

On the other hand, in the above scheme of switching between two LEDs, if thus employed two LEDs (for example, one for emitting red light and the other for emitting blue light) emit light in different luminance from each other, then the brightness of the illumination fluctuates depending on the color as the two LEDs are switched between them. Such a fluctuation in the brightness of illumination is not preferable in sight of indication quality. Accordingly, an indication mechanism is needed, which is capable of suppressing the fluctuation in brightness when the two illuminations are switched between them.

As one method for suppressing such a fluctuation in brightness, as disclosed in Japanese Patent Laying-Open No. 8-223365, the luminance of light emitted from an LED may be adjusted by adjusting the driving current of the LED and others. In order to employ such a method, however, control circuitry for controlling the driving current of an LED may be needed, which will be a factor to increase the manufacturing costs of the electronic device. Therefore, conventionally, it has been difficult to suppress at low costs such a fluctuation in brightness in electronic devices, such as a disc drive apparatus including an indication mechanism switching between two colors of illumination.

SUMMARY OF THE INVENTION

An object of the present invention is to provide a disc drive apparatus and an electronic device that includes an indication mechanism capable of suppressing fluctuation in brightness at low cost, when the colors of illumination are switched.

A disc drive apparatus according to the present invention is a disc drive apparatus using a disc-like recording medium, and includes a casing, a substrate (a printed circuit board), two light emitting elements, a light guiding member, a light reflecting film, and a motor. The casing includes a front panel having an opening. The substrate is arranged adjacent to the front panel inside the casing. The two light emitting elements are arranged on the substrate. The light guiding member is arranged adjacent to the two light emitting elements on the substrate for guiding light emitted from the light emitting elements. The white-colored light reflecting film is positioned in a light emitting direction of a low luminance light emitting element and formed on a surface of the substrate positioned below the light guiding member. The low luminance light emitting element is one of the two light emitting elements and emitting light in lower luminance relative to the other of the two light emitting elements. The motor is arranged adjacent to the light guiding member and the light reflecting film on the substrate. The light guiding member includes an output portion inserted in the opening of the front panel for outputting light provided from the two light emitting elements. The light guiding member is provided with a satin finish at a surface of a portion facing the other light emitting element. The front panel includes a convex portion protruding below a portion that is farthest from the two light emitting elements in a portion adjacent to the output portion of the light guiding member.

Thus, the light that has been emitted from the low luminance light emitting element but not directly entered to the light guiding member, or the light leaked out from the light guiding member can be reflected at white-colored light reflecting film to be entered into the light guiding member. Thus, light emitted from the low luminance light emitting element can be efficiently collected into the light guiding member.

Further, in the disc drive apparatus above, the motor is arranged adjacent to the emitting path of the light from the low luminance light emitting element. Therefore, part of the light that has been emitted from the low luminance light emitting element but not directly entered to the light guiding member, or the light leaked out from the light guiding member can be reflected at the casing surface of the motor to be entered into the light guiding member. As a result, the light emitted from the low luminance light emitting element may more efficiently be collected into the light guiding member to pass it to the output portion thereof.

Thus, since greater amount of light emitted from the low luminance light emitting element may be output from the output portion, sufficient brightness is ensured even when the low luminance light emitting element is employed.

Still further, in the disc drive apparatus above, the light emitted from another light emitting element that is not the low luminance light emitting element (i.e., a high luminance light emitting element that emits light in relatively high luminance) entering into the light guiding member may be scattered to the outside thereof from the satin-work portion on the surface of the light guiding member. Accordingly, the light emitted from the high luminance light emitting element can be reduced in quantity until it reaches the output portion of the light guiding member to be output therefrom.

As a result, the occurrence of the difference in brightness between the light originally emitted from the high luminance light emitting element and produced from the output portion via the light guiding member, and the light originally emitted from the low luminance light emitting element and produced from the output portion may be suppressed (the brightness of the light output from the output portion becoming relatively lower when using the low luminance light emitting element may be avoided). In other words, in the disc drive apparatus as described above, which includes the indication mechanism where different light emitting elements are switched between them to emit different colors of light alternatively, the fluctuation in brightness between different colors of light is suppressed.

Further, according to the disc drive apparatus of the present invention, the convex portion is formed, in a portion of the light guiding member adjacent to the output portion, under a portion that is farthest from the light emitting elements. Therefore, the light leaked out from the light guiding member can be reflected by the convex portion near a portion of output portion farthest from the light emitting elements. As such, the light reflected at the convex portion can be re-entered to the output portion of the light guiding member. Accordingly, the quantity of light output from the portion of the output portion positioned farthest from the light emitting elements may be increased. Thus, the local fluctuation in the quantity of light output from the output portion may be suppressed. As a result, since constant light is produced from the whole output portion, when a user of the disc drive apparatus sees the output portion, problems are avoided such as difficulty in recognizing indication (illumination) of the output portion being partially darkened, or unevenness in indication (such as in brightness) depending on the direction from where it is seen.

Still further, as described above, employing such a relatively simple structure, where the light reflecting film is partially formed on the substrate, the need for control circuitry is eliminated, which would otherwise be necessary to control the driving current of the light emitting elements such as LEDs. Thus, the disc drive apparatus according to the present invention may be implemented at low costs.

Further, an electronic device according to the present invention includes a substrate, a plurality of light emitting elements, a light guiding member, and a light reflecting portion. The plurality of light emitting elements are arranged on the substrate. The light guiding member is arranged adjacent to the plurality of light emitting elements on the substrate for guiding light emitted from the light emitting elements. The light reflecting portion is positioned in a light emitting direction of a low luminance light emitting element and arranged to face to a surface of the light guiding member. The low luminance light emitting element is one of the plurality of light emitting elements and emitting light in lower luminance relative to other of the plurality of light emitting elements.

Thus, the light that has been emitted from the low luminance light emitting element but not directly entered to the light guiding member, or the light leaked out from the light guiding member can be reflected at light reflecting portion to be entered into the light guiding member. Thus, light emitted from the low luminance light emitting element can be efficiently collected into the light guiding member. Therefore, when the light emitted from the low luminance light emitting element is output from an output portion formed in the light guiding member for outputting light, since much light which originally has been emitted from the low luminance light emitting element can be output from the output portion, sufficient brightness is ensured.

As a result, the occurrence of the difference in brightness between the light originally emitted from the light emitting element except for the low luminance light emitting element (a light emitting element that emits light with relatively high luminance) and produced from the output portion via the light guiding member, and the light originally emitted from the low luminance light emitting element and produced from the output portion may be suppressed. In other words, in the electronic device, which includes the indication mechanism where different light emitting elements are switched between them to emit different colors of light alternatively, the fluctuation in brightness between different colors of light is suppressed, since the quantity of light produced from the output portion of the light guiding member is ensured irrespective of the color of illumination. Accordingly, problems are avoided when a user of the electronic device sees the output portion of the light guiding member, such as difficulty in recognizing indication of the output portion being partially darkened due to the color of the illumination, or unevenness in indication depending on the direction from where it is seen.

Still further, as described above, employing such a relatively simple structure, where the light reflecting portion is partially formed, the need for control circuitry is eliminated, which would otherwise be necessary to control the driving current of the light emitting elements such as LEDs. Thus the electronic device according to the present invention may be implemented at low costs.

In the electronic device above, the light reflecting portion may be a light reflecting film formed on a surface of the substrate positioned below the light guiding member.

In this case, since the light reflecting film may be formed on the surface of the substrate using print processes or the like, the electronic device according to the present invention may be manufactured at lower costs.

Further, in the electronic device above, color of the light reflecting film may be selected from the group consisting of white, a metallic color, and a color of the same color base with the light emitted from the low luminance light emitting element.

Setting the color of the light reflecting film as white or a metallic color, the light emitted from the low luminance light emitting element can be efficiently reflected. As a result, the quantity of the light entering the light guiding member may efficiently be increased.

Additionally, if the color of the light reflecting film is of the same color base as the light emitted from the low luminance light emitting element, the light reflected at the light reflecting film can be ensured to be the same as that of the light emitted from the low luminance light emitting element.

In the electronic device above, the color of the light reflecting film is the same as an indication character formed on the surface of the substrate.

In this case, when printing the indication characters on the surface of the substrate, the light reflecting film can be printed on the surface of the substrate simultaneously.

Therefore, the manufacturing cost of the electronic device can be reduced as compared to a case where the light reflecting film and the indication character are formed in separate processes.

In the electronic device above, a satin-work may be provided on a surface of a portion of the light guiding member facing a light emitting element except for the low luminance light emitting element.

In this case, the light emitted from a light emitting element except for the low luminance light emitting element (i.e., a high luminance light emitting element that emits light in relatively high luminance) entering into the light guiding member may be scattered to the outside thereof from the satin-work portion on the surface of the light guiding member. Accordingly, the light emitted from the high luminance light emitting element can be reduced in quantity until it reaches the output portion of the light guiding member to be output therefrom. As a result, the fluctuation in quantity of light output from the output portion of the light guiding member is less likely to occur, between the emission of the low luminance light emitting element and high luminance light emitting element.

The electronic device above may further include an additional member arranged adjacent to the light guiding member and the light reflecting portion. The additional member may be a motor.

In this case, the additional member is arranged adjacent to the emitting path of light emitted from the low luminance light emitting element. Accordingly, the light that has been emitted from the low luminance light emitting element but not directly entered to the light guiding member, or the light leaked out from the light guiding member can be reflected at a surface of the additional member to be entered into the light guiding member. Thus, light emitted from the low luminance light emitting element can be efficiently passed to the output portion of the light guiding member. Therefore, when the low luminance light emitting element, the quantity of the light output from the output portion of the light guiding member may be effectively increased.

In the electronic device above, the light guiding member includes an output portion for outputting light provided from the plurality of light emitting elements. The electronic device may further includes an additional light reflecting portion arranged below a portion that is farthest from the plurality of light emitting elements in a portion adjacent to the output portion of the light guiding member.

Here, at the portion of the output portion positioned farthest from the light emitting elements, of the light emitted from the light emitting elements, the quantity of light reaching thereto will be relatively reduced as compared to other part. Thus, the quantity of light output from the above mentioned portion tends to decrease (darkened) as well. Arranging the additional light reflecting portion as above, the light leaked out from the light guiding member can be reflected by the additional light reflecting portion near a portion of output portion farthest from the light emitting elements. As such, the light reflected at the additional light reflecting portion can be re-entered to the output portion of the light guiding member. Accordingly, the quantity of light output from the portion of the output portion positioned farthest from the light emitting elements may be increased. Thus, the local fluctuation in the quantity of light output from the output portion may be suppressed. As a result, since constant light is produced from the whole output portion, when a user of the electronic device sees the output portion, problems such as difficulty in recognizing indication (illumination) of the output portion being partially darkened are avoided.

The electronic device above may further include a panel member adjacent to the substrate and formed with an opening for accommodating the output portion of the light guiding member. In the electronic device, the additional light reflecting portion may be a convex portion extending from a portion adjacent to the opening of the panel member to below the light guiding member.

In this case, since a convex portion as the additional light reflecting portion is formed by a relatively simple process of providing the convex portion below the opening of the panel member, the electronic device according to the present invention can be obtained at low costs.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
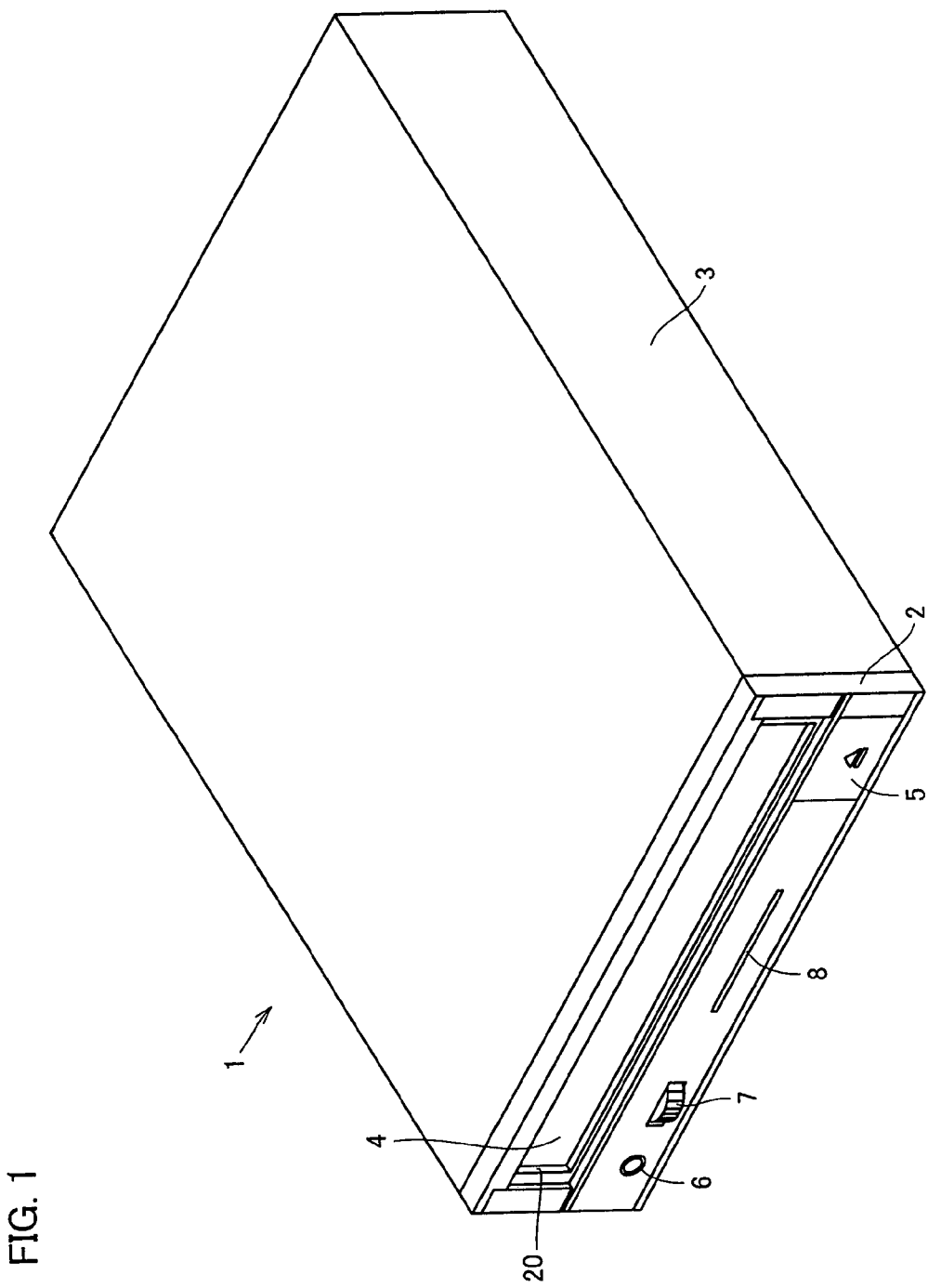
FIG. 1 is a schematic perspective view showing a disc drive apparatus according to the present invention.

In the following, an embodiment of the present invention is described referring to the figures. Throughout the figures, the identical or corresponding parts are given an identical reference character, and description thereof is not repeated.

Referring to FIGS. 1–5, a disc drive apparatus according to the present invention is described.

As shown in FIG. 1, a disc drive apparatus 1 as an electronic device includes a case 3 storing inside a disc tray (a slide tray) and a motor, a front panel 2 arranged to cover the front side of case 3, and a slide tray 4 that can be slid to the front side through a slide tray opening 20 of front panel 2. Front panel 2 and case 3 constitute a casing of disc drive apparatus 1. Though it is not shown, inside case 3, a motor, or a read/write device for reading from and writing to a disc-like recording medium loaded on slide tray 4 is accommodated. In front panel 2, jack 6 for accommodating a connector of a headphone or the like, a volume switch 7 for changing a playback audio volume of the disc, a light emitting indication portion 8 for indicating a reading operation to and a writing operation from the disc distinguishably, and a switch 5 for a power supply or the like are arranged.

Figure 2:
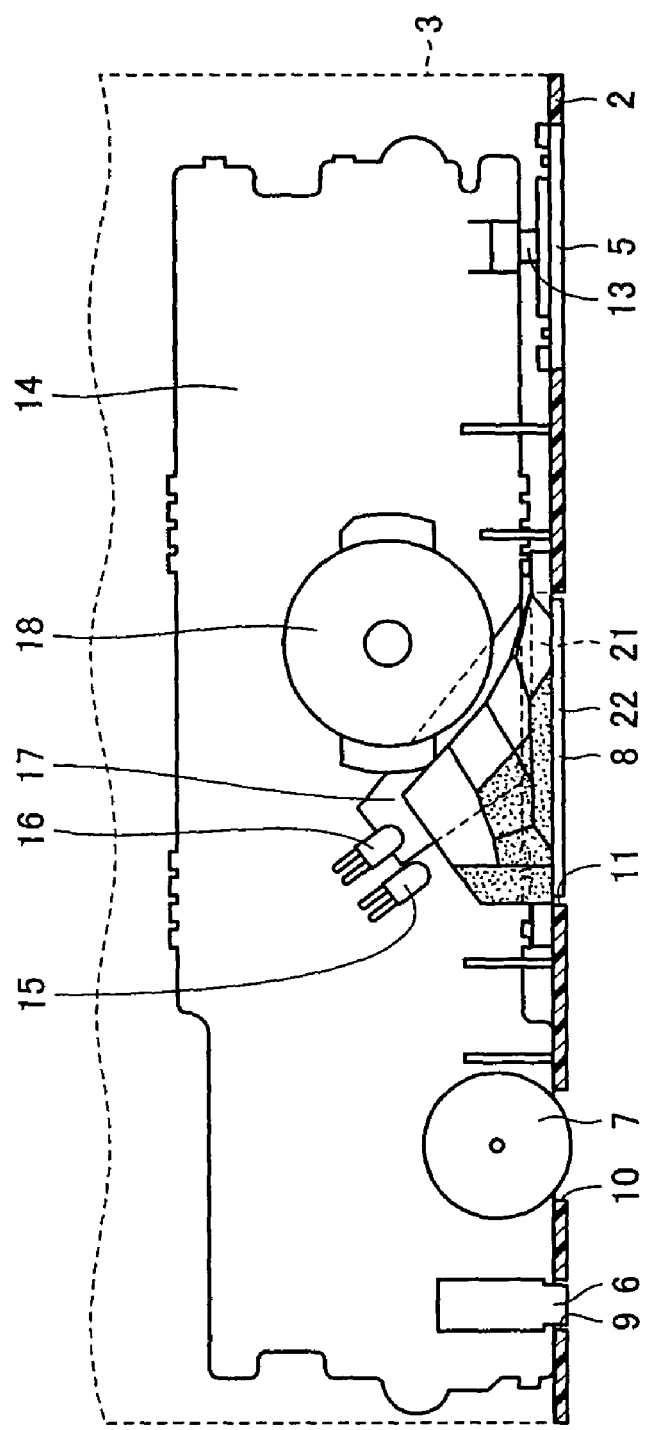
FIG. 2 is a partial plan view showing a front panel and a substrate provided adjacent to the front panel in the disc drive apparatus shown in FIG. 1.

As shown in FIG. 2, inside disc drive apparatus 1, a substrate 14 is arranged adjacent to front panel 2. On substrate 14, the above mentioned jack 6, volume switch 7, light guiding member 12 (see FIG. 3) including light emitting indication portion 8, and a detector 13 for detecting that switch 5 is pressed are arranged. The end of jack 6 is exposed to the front side of disc drive apparatus 1 at an opening 9 formed in front panel 2. Further, part of volume switch 7 is also exposed at an opening 10 formed in front panel 2. Still further, light emitting indication portion 8 is structured by fitting and fixing part of light guiding member 12 into an opening 11 formed in front panel 2.

Figure 3:
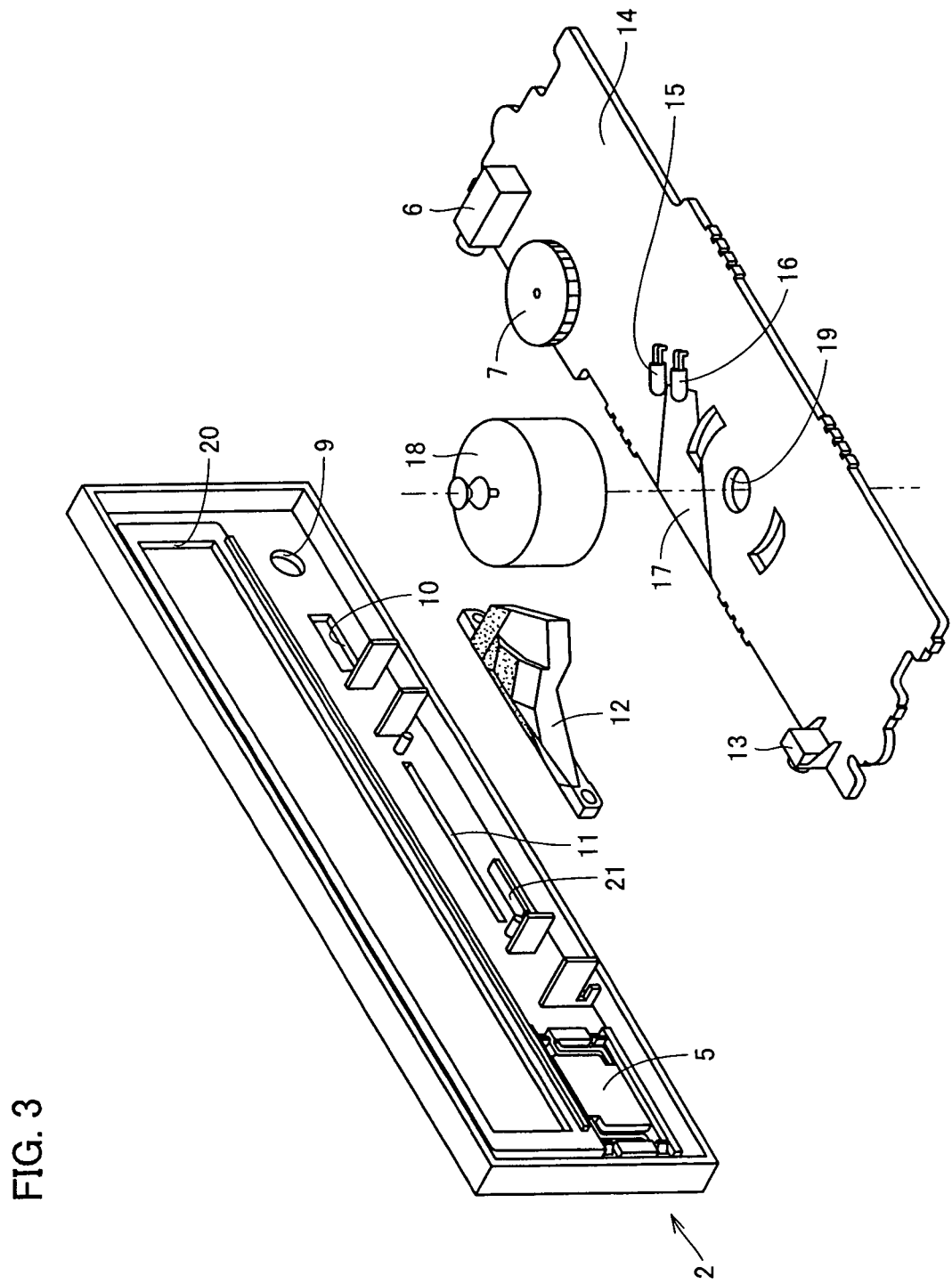
FIG. 3 is a schematic developed view showing the front panel, the substrate and a light guiding member shown in FIG. 2.

On substrate (a printed circuit board) 14 and adjacent to light guiding member 12, an LED 15 emitting red light and an LED 16 emitting blue light are arranged. Here, the luminance of the blue light emitted from LED 16 as a low luminance light emitting element is lower than that of the red light emitted from LED 15 as a high luminance light emitting element. Accordingly, in the direction to which the blue light is emitted from LED 16, a white print portion 17 as a light reflecting film or a light reflecting portion is formed on the surface of substrate 14. Additionally, a motor 18 is arranged on substrate 14 and adjacent to light guiding member 12 and white print portion 17. Motor 18 as an additional member is used, for example, to control the sliding operation of slide tray 4. Motor 18 is, as shown in FIG. 3, arranged such that the central portion of opening 19 formed in substrate 14 and the central axis of motor 18 substantially match. White print portion 17 is formed to extend from a region below the path through which light is introduced from blue light LED 16 in light guiding member 12 to a region where motor 18 is arranged.

As can be seen from FIG. 3, a protrusion 21 as a convex portion is partially formed in a portion below opening 11 of front panel 2 as a panel member. Protrusion 21 as an additional light reflecting portion is formed to extend from a portion below and adjacent to opening 11 of front panel 2 to below light guiding member 12. Further, as can be seen also from FIG. 2, protrusion 21 is arranged below a portion that is positioned farthest from LEDs 15, 16 in light guiding member 12.

Figure 4:
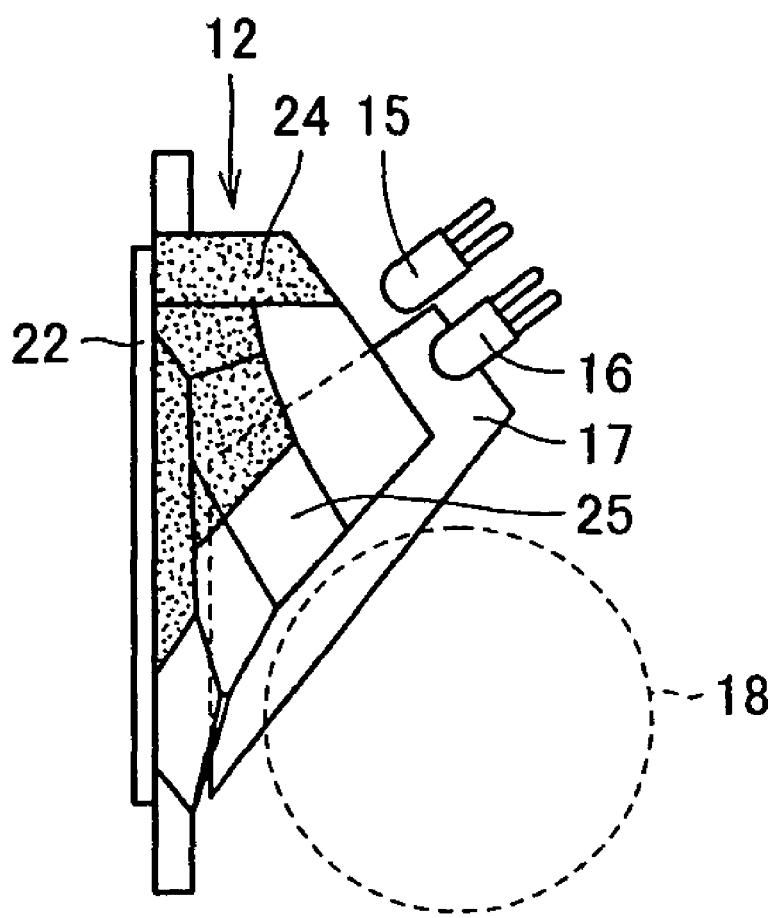
FIG. 4 is a schematic view showing a two-dimensional shape of the light guiding member shown in FIG. 3.

As can be seen also from FIG. 4, a satin finish portion 24 provided with a satin-like finish to have rough surface (a satin finish), and a clear finish portion 25 finished to have a smooth surface are provided on the surface of light guiding member 12. Clear finish portion 25 is mainly formed on the surface of a portion to be the path of light emitted from blue light emitting LED 16 (the portion facing LED 16). Satin finish portion 24 is formed on the surface of a portion to be the path of light emitted from red light emitting LED 15 (the portion facing LED 15).

Figure 5:
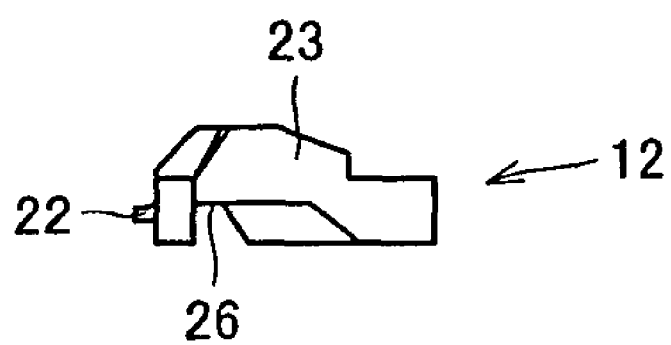
FIG. 5 is a schematic view showing a side shape of the light guiding member shown in FIG. 4.

As can be seen also from FIG. 5, a convex portion 23 and a concave portion 26 are formed at the upper side and at the bottom wall of light guiding member 12, respectively. Thus, the light emitted from LEDs 15, 16 and introduced into light emitting member 12 will be hindered from straightly entering into convex portion 22 to be light indication portion 8 (see FIG. 1) as an output portion. Note that FIG. 4 illustrates the relative positional relationship among light guiding member 12, LEDs 15, 16 white print portion 17, and motor 18.

Next, an operation of the indication mechanism related to the light emitting indication portion of the disc drive apparatus according to the present invention is briefly described.

As described above, light emitting indication portion 8 (see FIG. 1) of disc drive apparatus 1 (see FIG. 1) is for distinguishably indicating a reading operation mode and a write operation mode of a disc-like recording medium (not shown) in disc drive apparatus 1. For example, consider a case where light emitting indication portion 8 is caused to emit in blue during a reading operation mode, and to emit in red during a writing operation mode. In this case, during a reading operation mode, a driving current is supplied to LED 15, which is one of a plurality of light emitting elements, to cause LED 15 to emit red light. The red light emitted from LED 15 enters into light guiding member 12, and then part of the red light is scattered to the outside of light guiding member 12 from the satin-work portion (satin finish portion 24) on the surface of light guiding member 12. As a result, the light propagated through light guiding member 12 is output from light emitting indication portion 8 (convex portion 22), in a relatively smaller quantity than at the point of entering into light guiding member 12. (The light emitted from LED 15 can be reduced in quantity until it reaches light emitting indication portion 8 of light guiding member 12 to be output therefrom.)

Further, during a writing operation mode, the current supply to LED 15 is stopped, while the driving current is supplied to LED 16 to cause LED 16 to emit blue light. At this time, of the light having been emitted from LED 16, the light entered into light guiding member 12 propagates therethrough, and the light not directly entered into light guiding member 12 can be cause to enter therein, as will be described below. Accordingly, the blue light emitted from LED 16 may efficiently be output from light emitting indication portion 8.

In other words, in disc drive apparatus 1 shown in FIGS. 1–5, the light that has been emitted from LED 16 as a low luminance light emitting element but not directly entered to light guiding member 12, or the light leaked out from light guiding member 12 can be reflected at white print portion 17 as a white-colored light reflecting film to be entered into light guiding member 12. Thus, light emitted from LED 16 can be efficiently collected into light guiding member 12.

Further, in the disc drive apparatus 1 above, motor 18 is arranged adjacent to the emitting path of the light from LED 16. Therefore, part of the blue light that has been emitted from LED 16 as a low luminance light emitting element but not directly entered to light guiding member 12, or the light leaked out from light guiding member 12 can be reflected at the casing surface (side wall face) of motor 18 to be entered into light guiding member 12. As a result, the light emitted from LED 16 may more efficiently be collected into light guiding member 12 to pass it to light emitting indication portion 8 as an output portion thereof. Thus, since greater amount of light emitted from LED 16 may be output from light emitting indication portion 8, sufficient brightness is ensured even when LED 16, which is a low luminance light emitting element, is employed.

Accordingly, the occurrence of the difference in brightness between the light originally emitted from LED 15 and produced from light emitting indication portion 8 via light guiding member 12, and the light originally emitted from LED 16 and produced from light emitting indication portion 8 may be suppressed (the brightness of the light output from light emitting indication portion 8 that has been emitted from LED 16 becoming relatively lower may be avoided). In other words, in disc drive apparatus 1 as described above, which includes the indication mechanism where different LEDs 15, 16 are switched between them to emit red light and blue light alternatively, the fluctuation in brightness between red light indication and blue light indication is suppressed.

Further, according to disc drive apparatus 1 of the present invention, protrusion 21 as a convex portion is formed to protrude, in a portion of light guiding member 12 adjacent to light emitting indication portion 8, under a portion that is farthest from LEDs 15, 16 and is above substrate 14. Therefore, the light leaked out from light guiding member 12 to substrate 14 side can be reflected by protrusion 21 into the portion of light emitting indication portion 8 positioned farthest from LEDs 15, 16. As such, the light reflected at protrusion 21 can be re-entered to light emitting indication portion 8 of light guiding member 12. Accordingly, the quantity of light output from the portion of light emitting indication portion 8 positioned farthest from LEDs 15, 16 may be increased. Thus, the local fluctuation in the quantity of light output from light emitting indication portion 8 may be suppressed. As a result, since constant light is produced from the whole light emitting indication portion 8, when a user of disc drive apparatus 1 sees the light emitting indication portion 8, problems are avoided such as difficulty in recognizing indication (illumination) of light emitting indication portion 8 being partially darkened, or unevenness in indication (such as in brightness) depending on the direction from where it is seen.

Still further, as described above, employing such a relatively simple structure, where white print portion 17 is partially formed on substrate 14, the need for control circuitry is eliminated, which would otherwise be necessary to control the driving current of the light emitting elements such as LEDs 15, 16. Thus, disc drive apparatus 1 according to the present invention may be implemented at low costs.

It should be noted that, the color of white print portion 17 that is for reflecting the light from blue light emitting LED 16 (see FIG. 2) to cause much light to enter light emitting indication portion 8 may be in other colors, as long as it is capable of reflecting light from LED 16. For example, a metallic color print portion may be formed alternative to white print portion 17. Such a metallic color print portion can achieve the similar effect as white print portion 17. Further, a blue print portion, which is in the color of light to be reflected, may be formed alternative to white print portion 17. In this case also, the similar effect as white print portion 17 can be attained.

In disc drive apparatus 1, the color of white print portion 17 is preferably the same with other indication characters formed on the surface of substrate 14. Thus, when printing the indication characters on the surface of substrate 14, white print portion 17 may be formed simultaneously. It reduces the manufacturing cost of disc drive apparatus 1 as compared to a case where white print portion 17 and the indication characters are formed in separate processes.

Further, in the embodiment described above, though white print portion 17 is formed on substrate 14, a reflecting face for reflecting the light from LED 16 may be formed on the surface of light guiding member 12. For example, as shown in FIG. 4, a reflect print face for reflecting light may be formed to the portion with clear finish portion 25 that corresponds to the path of light from blue light LED 16. Note that, since in this case the light that has not directly entered to light guiding member 12 from LED 16 is obstructed by such a reflecting face and can not enter to light guiding member 12 in the halfway of the path, it is more preferable to form white print portion 17 on the surface of substrate 14 as shown in FIGS. 1–5.

Still further, though in disc drive apparatus 1 shown in FIGS. 1–5, two LEDs 15, 16 are employed for switching between two colors of light in light emitting indication portion 8 (see FIG. 1), when three or more colors of light are to be switched at light emitting indication portion 8, three or more LEDs emitting different colors of light may be employed. In such a case, a print portion corresponding to white print portion 17 may be formed below the path of light from the LED with the lowest luminance among the plurality of LEDs.

Though LEDs 15, 16 are employed as light emitting elements in the above embodiment, the present invention is applicable where a plurality of light emitting elements with different luminance are employed, and the similar effect can be achieved when light emitting elements other than LEDs are used.

Though LEDs 15, 16 are arranged displaced from the center of light emitting indication portion 8 on a plane along substrate 14 in the above embodiment, the arrangement of LEDs 15, 16 may be arbitrarily determined in accordance with the apparatus structure of disc drive apparatus 1. For example, LEDs 15, 16 may be arranged facing the center of light emitting indication portion 8 on a plane along the surface of substrate 14. The present invention is applicable as well to such an arrangement.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc drive apparatus using a disk-like recording medium, comprising:

a casing including a front panel having an opening;

a substrate arranged adjacent to said front panel inside said casing;

two light emitting elements arranged on said substrate;

a light guiding member arranged adjacent to said two light emitting elements on said substrate for guiding light emitted from said light emitting elements;

a white-colored light reflecting film positioned in a light emitting direction of a low luminance light emitting element and formed on a surface of said substrate positioned below said light guiding member, said low luminance light emitting element being one of said two light emitting elements and emitting light in lower luminance relative to other of said two light emitting elements; and a motor arranged adjacent to said light guiding member and said light reflecting film on said substrate;

wherein said light guiding member includes an output portion inserted in the opening of said front panel for outputting light provided from said two light emitting elements, said light guiding member is provided with a satin finish at a surface of a portion facing said other of said two light emitting elements, and said front panel includes a convex portion protruding below a portion that is farthest from said two light emitting elements in a portion adjacent to said output portion of said light guiding member.

2. An electronic device, comprising:

a substrate;

a plurality of light emitting elements arranged on said substrate;

a light guiding member arranged adjacent to said plurality of light emitting elements on said substrate for guiding light emitted from said light emitting elements; and a light reflecting portion positioned in a light emitting direction of a low luminance light emitting element and arranged to face to a surface of said light guiding member, wherein said low luminance light emitting element is one of said plurality of light emitting elements, and emits light lower in luminance than at least one of said plurality of light emitting elements, and wherein a satin finish is provided on a surface of a portion of said light guiding member facing a light emitting element except for said low luminance light emitting element.

3. The electronic device according to claim 2, wherein said light reflecting portion is a light reflecting film formed on a surface of said substrate positioned below said light guiding member.

4. The electronic device according to claim 3, wherein a color of said light reflecting film is one selected from the group consisting of white, a metallic color, and a color of the light emitted from said low luminance light emitting element.

5. The electronic device according to claim 3, wherein a color of said light reflecting film is the same as an indication character formed on the surface of said substrate.

6. The electronic device according to claim 2, further comprising an additional member arranged adjacent to said light guiding member and said light reflecting portion.

7. The electronic device according to claim 6, wherein said additional member is a motor.

8. The electronic device according to claim 2, wherein said light guiding member includes an output portion for outputting light provided from said plurality of light emitting elements;

said electronic device further comprising an additional light reflecting portion arranged below a portion that is farthest from said plurality of light emitting elements in a portion adjacent to said output portion of said light guiding member.

9. The electronic device according to claim 8, further comprising a panel member adjacent to said substrate and provided with an opening for accommodating the output portion of said light guiding member, wherein said additional light reflecting portion is a convex portion extending from a portion adjacent to the opening of said panel member to below said light guiding member.

* * * * *